UNITED STATES PATENT OFFICE.

CHARLES FRANCIS ALLEN, OF NEW BRIGHTON, NEW YORK.

PROCESS OF PRODUCING TANNIN AND THE PRODUCT.

1,078,893.

Specification of Letters Patent.

Patented Nov. 18, 1913.

No Drawing.

Application filed January 5, 1912. Serial No. 669,559.

*To all whom it may concern:*

Be it known that I, CHARLES FRANCIS ALLEN, a subject of the King of England, now residing at New Brighton, Richmond county, New York, have invented certain new and useful Improvements in Processes of Producing Tannin and the Product, of which the following is a specification.

My invention relates particularly to a new product, that is tannin substantially free from acid, and a process by which that product may be secured.

Tannin is a substance which has long been known and widely used, but so far as I am conversant with the varieties earlier produced, they invariably contained an acid, usually gallotannic acid.

By producing tannin from the envelops, hulls or shells of pecan nuts, also known as *Carya olivæ formis*, using a process devised by me, I have produced a tannin which I believe has new and valuable properties, or more strictly speaking is without those objectionable characteristics which the ordinary tannins of commerce possess, the most important of which is that already noted.

The new product which I have discovered may be recognized by its reactions shown by testing with various substances. For instance this tannin when tested with bromin water, produces a precipitate, though it is not peculiar in that, but other tests show differences over other tannins. Iron alum gives a green precipitate, sodium nitrate and N—10HCl gives pink precipitate; cupric sulfate, gives no change in color; cupric sulfate followed by ammonia gives a decided blue precipitate; ferrous sulfate gives a black precipitate; ferric sulfate gives a greenish black precipitate; stannous chlorid and concentrated hydrochloric acid gives a yellowish color; sodium sulfite gives no change; concentrated sulfuric acid gives, on standing, a precipitate though at first it is only cloudy; lime water gives a dark gray precipitate; ammonium vanadate gives a light blue color; ferric acetate gives a dark black precipitate; cupric acetate gives a brown precipitate; cupric acetate with the subsequent addition of ammonium carbonate gives a blue precipitate.

It will be noted that the test with lime water gives a dark gray precipitate and not the dark brown precipitate which would indicate the presence of elagic acid, that the test with iron alum produces a green precipitate and not the blue black precipitate which occurs when gallic acid is present; also that the test with sodium sulfite produces no change and not the gradual change which the presence of gallic acid would cause. I am confident therefore in my belief that my product is, as stated, substantially free from acid and that it is a new product.

This product I have produced as follows:—Having selected a quantity of the shells or coverings enveloping and protecting the meat of the pecan nut, (taking care to include as much as possible of the interior lining of the shells), I grind such material to fine powder; preferably such as will pass through a 30 mesh sieve, then I make an infusion of this powder with boiling water, using one gallon of water to two pounds of the powdered shells and preferably pouring the boiling water over the powdered shells, as this is easier than to put the powder into the water and mix them together. The infusion is permitted to stand until cool, when some of the still solid particles will have settled to the bottom of the containing vessel. I then decant the clear liquor, place the residuum in a percolator, packing it tightly therein, and pour over it a quantity of alcohol, using about 4 ounces of alcohol to each two pounds of the original quantity of the powder. After pouring in the alcohol, I pour in the clear liquid, which was decanted as aforesaid, and let the mixture percolate. If the resultant liquor is less than a gallon per two pounds of original powder, I usually pour more water into the percolator, until the quantity of percolated liquor is equal to one gallon per two pounds of original powder. When the percolation has terminated, the percolated liquor is ready for use in tanning very fine qualities of leather and will be found to consist of a variety or quality of tannin not heretofore obtained and to be free from many ingredients which are deleterious in tanning fine leathers, but which are ordinarily associated with other tanning substances.

The percentages named are, as stated, preferential, but I may vary them considerably since a greater quantity of water will produce a tannin solution, but it will be weaker than usually desired, but nevertheless a good tannin for some uses. So too a smaller quantity of water will produce a tannin, but not as much as may be produced from the basic material when the preferred proportions are employed, nevertheless I may use more or less water and more or less alcohol, one particular advantage of the latter being that it will prevent the solution from spoiling.

I find that I get my best results when I use the water at the boiling point.

Some success may be attained by using benzin, chloroform, ether, alcohol, gasolene, naphtha or glycerin for the first diluent, in place of water, the quantity being preferably about the same, in proportion, as the water, but the water is important at some step of my process and if I did not use it in the solution, then I would use it in the drench which I use after packing the first residuum in the percolator.

There have been tannins produced heretofore, which were called pure tannins, but I know of no one of them which does not show, on test, that gallic or gallotannic acid is present. In short, tannin without such acid or other elements equally objectionable does not seem to exist as an independent natural substance. I have succeeded in so dividing and combining the composition of matter grown as a pecan nut shell, that I have produced what I term a pure tannin, but which differs, as noted from earlier products.

What I claim and desire to secure by Letters Patent is:—

1. As a new composition of matter, pecan nut shell tannin possessing the herein described characteristics, practically free from acids and free from the woody constituents of the shells and giving reactions under various tests, such as follows; with iron alum, a green precipitate; sodium nitrate, a pink precipitate; cupric sulfate, no change in color; cupric sulfate followed by ammonia, a decided blue; ferrous sulfate, a black precipitate; ferric sulfate, a greenish black precipitate; stannous chlorid and concentrated hydrochloric acid, a yellowish color; sodium sulfite, no change in color; concentrated sulfuric acid, a precipitate, on standing; ferric acetate, a dark black precipitate; cupric acetate, a brown precipitate; cupric acetate, addition of ammonium carbonate, a blue precipitate; all substantially as set forth.

2. As a new composition of matter, a liquid manufactured from pecan nut shells, water and alcohol, possessing the herein described characteristics, practically free from acids and free from the woody constituents of the shells and giving reactions under various tests, such as follows; with iron alum, a green precipitate; sodium nitrate, a pink precipitate; cupric sulfate, no change in color; cupric sulfate followed by ammonia, a decided blue; ferrous sulfate, a black precipitate; ferric sulfate, a greenish black precipitate; stannous chlorid and concentrated hydrochloric acid, a yellowish color; sodium sulfite, no change in color; concentrated sulfuric acid, a precipitate, on standing; ferric acetate, a dark black precipitate; cupric acetate, a brown precipitate; cupric acetate, addition of ammonium carbonate, a blue precipitate; all substantially as set forth.

3. As a new composition of matter, a tannin manufactured from pecan nut shells, water and alcohol, possessing the herein described characteristics, practically free from acids and free from the woody constituents of the shells and giving reactions under various tests, such as follows; with iron alum, a green precipitate; sodium nitrate, a pink precipitate; cupric sulfate, no change in color; cupric sulfate followed by ammonia, a decided blue; ferrous sulfate, a black precipitate; ferric sulfate, a greenish black precipitate; stannous chlorid and concentrated hydrochloric acid, a yellowish color; sodium sulfite, no change in color; concentrated sulfuric acid, a precipitate, on standing; ferric acetate, a dark black precipitate; cupric acetate, a brown precipitate; cupric acetate, addition of ammonium carbonate, a blue precipitate; all substantially as set forth.

4. As a new composition of matter, a tannin manufactured from pecan nut shells and possessing the following characteristics in its liquid form, as a solid extract and as a powdered extract, practically free from acids and free from the woody constituents of the shells and giving reactions under various tests, such as follows; with iron alum, a green precipitate, sodium nitrate, a pink precipitate; cupric sulfate, no change in color; cupric sulfate followed by ammonia, a decided blue; ferrous sulfate, a black precipitate; ferric sulfate, a greenish precipitate; stannous chlorid and concentrated hydrochloric acid, a yellowish color; sodium sulfite, no change in color; concentrated sulfuric acid, a precipitate, on standing; ferric acetate, a dark black precipitate; cupric acetate, a brown precipitate; cupric acetate, addition of ammonium carbonate, a blue precipitate; all substantially as set forth.

5. The process of producing a tannin solution possessing the herein described characteristics, which consists in comminuting pecan nut shells, mixing them with water at about the boiling point, allowing the mixture to stand, separating the liquid part, placing the other part in a percolator, adding alcohol and the previously separated liquid and drawing off the percolations, all substantially as set forth.

6. The process of producing a tannin solution, which consists in comminuting pecan nut shells, mixing them with a liquid tannin solvent, allowing the mixture to stand, separating the liquid part, placing the other part in a percolator, adding alcohol and the previously separated liquid and drawing off the percolations, all substantially as set forth.

7. The process of producing a tannin solution, which consists in comminuting pecan nut shells, mixing them with hot water, allowing the mixture to stand and cool, separating the liquid part, placing the other part in a percolator, adding alcohol and the previous separated liquid and drawing off the percolations, all substantially as set forth.

8. The process of producing a tannin solution, which consists in comminuting pecan nut shells, mixing them with a liquid tannin solvent, allowing the mixture to stand, separating the liquid part, placing the other part in a percolator, adding alcohol and the previously separated liquid and drawing off the percolations, using substantially the proportions specified, to wit, about two pounds of powdered shells to one gallon of water and 4 ounces of alcohol, all substantially as set forth.

In testimony whereof, I have signed my name to this specification in the presence of two subscribing witnesses, this 2d day of January, 1912.

CHARLES FRANCIS ALLEN.

Witnesses:
ALICE M. KEALY,
LILA B. WARREN.